US011632621B2

(12) United States Patent
Gong et al.

(10) Patent No.: US 11,632,621 B2
(45) Date of Patent: Apr. 18, 2023

(54) METHOD FOR CONTROLLING VOLUME OF WIRELESS HEADSET, AND COMPUTER-READABLE STORAGE MEDIUM

(71) Applicant: GUANGDONG OPPO MOBILE TELECOMMUNICATIONS CORP., LTD., Guangdong (CN)

(72) Inventors: Jinhua Gong, Guangdong (CN); Baoti Li, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 6 days.

(21) Appl. No.: 17/157,232

(22) Filed: Jan. 25, 2021

(65) Prior Publication Data

US 2021/0144463 A1    May 13, 2021

Related U.S. Application Data

(63) Continuation of application No. PCT/CN2019/088164, filed on May 23, 2019.

(30) Foreign Application Priority Data

Jul. 27, 2018 (CN) .......................... 201810844509.2

(51) Int. Cl.
*H04R 1/10* (2006.01)
*H04B 1/3827* (2015.01)

(52) U.S. Cl.
CPC ......... *H04R 1/1091* (2013.01); *H04B 1/3827* (2013.01); *H04R 2420/07* (2013.01); *H04R 2430/01* (2013.01)

(58) Field of Classification Search
CPC .............. H04R 1/1091; H04R 2420/07; H04R 2430/01; H04B 1/3827
See application file for complete search history.

(56) References Cited

U.S. PATENT DOCUMENTS 9,444,423 B2     9/2016  Kim et al.
10,148,241 B1 *  12/2018 Peeler ...................... H03G 3/32
(Continued)

FOREIGN PATENT DOCUMENTS

| CN | 101917656 A | 12/2010 |
|---|---|---|
| CN | 201663675 U | 12/2010 |

(Continued)

OTHER PUBLICATIONS

Chinese First Office Action with English Translation for CN Application 202010093244.4 dated Feb. 8, 2021. (27 pages).

(Continued)

*Primary Examiner* — Daniel R Sellers
(74) *Attorney, Agent, or Firm* — Young Basile Hanlon & MacFarlane, P.C.

(57) ABSTRACT

Disclosed are a method for controlling the volume of a wireless headset, a wireless headset and a mobile terminal. The method comprises: when the mobile terminal is connected to a wireless headset in an in-ear state, acquiring a target play volume range of the wireless headset; adjusting the play volume of the wireless headset within the target play volume range; when volume determination information from the wireless headset is received, determining that the play volume of the wireless headset at the moment the volume determination information is received is a target play volume value; and adjusting the play volume of the wireless headset to be the target play volume value. The play volume of a wireless headset suitable for a user can be automatically and quickly set.

20 Claims, 4 Drawing Sheets

(56) References Cited

U.S. PATENT DOCUMENTS

| | | | |
|---|---|---|---|
| 10,871,818 B1* | 12/2020 | De La Cropte De Chanterac | G06F 1/325 |
| 2008/0013754 A1 | 1/2008 | Chuo et al. | |
| 2008/0153537 A1* | 6/2008 | Khawand | H04R 5/02 |
| | | | 455/550.1 |
| 2010/0254551 A1 | 10/2010 | Aoki et al. | |
| 2012/0096285 A1* | 4/2012 | Liu | G06F 1/32 |
| | | | 713/300 |
| 2012/0121096 A1* | 5/2012 | Chen | G10L 21/0364 |
| | | | 704/226 |
| 2013/0083933 A1* | 4/2013 | Aase | H04R 1/1091 |
| | | | 381/74 |
| 2016/0249126 A1* | 8/2016 | Konjeti | H04R 1/1091 |
| 2017/0188132 A1* | 6/2017 | Hirsch | G06F 1/3206 |
| 2017/0195811 A1 | 7/2017 | Yen et al. | |
| 2018/0278223 A1* | 9/2018 | Dow | H03G 3/002 |
| 2019/0165748 A1* | 5/2019 | Powell | H03G 3/3026 |

FOREIGN PATENT DOCUMENTS

| | | | |
|---|---|---|---|
| CN | 102172044 A | 8/2011 | |
| CN | 105245993 A | 1/2016 | |
| CN | 105246000 A | 1/2016 | |
| CN | 105446697 A | 3/2016 | |
| CN | 105472497 A | 4/2016 | |
| CN | 105872180 A | 8/2016 | |
| CN | 105898038 A | 8/2016 | |
| CN | 106027809 A | 10/2016 | |
| CN | 205726229 U | 11/2016 | |
| CN | 106302930 A | 1/2017 | |
| CN | 106406803 A | 2/2017 | |
| CN | 107623776 A | 1/2018 | |
| CN | 107786751 A | 3/2018 | |
| CN | 107872586 A | 4/2018 | |
| CN | 108052304 A | 5/2018 | |
| CN | 108235170 A | 6/2018 | |
| CN | 109151634 A | 1/2019 | |
| JP | H04278796 A | 10/1992 | |
| TW | 200640274 A | 11/2006 | |
| WO | 2011116723 A2 | 9/2011 | |

OTHER PUBLICATIONS

Chinese First Office Action with English Translation for Chinese application No. 201810844509.2, dated Jun. 20, 2019 (21 pages).

Notification to Grant Patent Right for Invention with English Translation for Chinese application No. 201810844509.2, dated Nov. 29, 2019 (7 pages).

International Search Report with English Translation for International application No. PCT/CN2019/088164, dated Jul. 24, 2019 (18 pages).

Chinese Notification to Grant Patent Right for Invention with English Translation for CN Application 202010093244.4 dated Nov. 30, 2021. (6 pages).

Chinese Second Office Action with English Translation for CN Application 202010093244.4 dated Jun. 12, 2021. (26 pages).

Extended European Search Report for EP Application 19841510.1 dated Aug. 17, 2021. (10 pages).

* cited by examiner

METHOD FOR CONTROLLING VOLUME OF WIRELESS HEADSET, AND COMPUTER-READABLE STORAGE MEDIUM

CROSS-REFERENCE TO RELATED APPLICATION(S)

The present application is a continuation-application of International (PCT) Patent Application No. PCT/CN2019/088164, filed on May 23, 2019, which claims foreign priority of Chinese Patent Application No. 201810844509.2, filed on Jul. 27, 2018, the entire contents of both of which are hereby incorporated by reference.

TECHNICAL FIELD

The present disclosure relates to the field of communications technologies, and in particular, to a method for controlling volume of a wireless headset, and a computer readable storage medium.

BACKGROUND

With the rapid development of mobile terminals, the sound quality of earphones is getting higher and higher. More and more users like to play the audio and video sound effects of mobile terminals through earphones, and enjoy multimedia play through earphones in various scenarios.

Due to personal habits or in different environments, there are external noises such as talking and vehicle walking when users listening to multimedia audio content through headphones. Users generally adjust the overall play volume in the mobile terminal to set the most appropriate headset play volume.

SUMMARY

The present disclosure provides a method for controlling volume of a wireless headset, and a computer readable storage medium to automatically and quickly set the play volume of the wireless headset applicable for users.

A first aspect of the present disclosure is to provide a method for controlling a volume of a wireless headset applied to a mobile terminal. The method includes: obtaining a target play volume range of the wireless headset, in response to the mobile terminal being connected to the wireless headset in an in-ear state; adjusting a play volume of the wireless headset within the target play volume range; determining the play volume of the wireless headset at a time of receiving a volume determination information as a target volume value, in response to receiving the volume determination information from the wireless headset; and adjusting the play volume of the wireless headset to the target volume value.

In some embodiments, the obtaining a target play volume range of the wireless headset includes: obtaining a minimum volume value of the play volume of the wireless headset in a first time period, and configuring the minimum volume value as a minimum value of the target play volume range; and obtaining a maximum volume value of the play volume of the wireless headset in the first time period, and configuring the maximum volume value as a maximum value of the target play volume range.

In some embodiments, the method further includes: receiving an external noise volume collected by the wireless headset; wherein the obtaining a target play volume range of the wireless headset includes: determining the target play volume range corresponding to the external noise volume based on a mapping relationship between noise volume levels and play volume ranges.

In some embodiments, the mapping relation between noise volume levels and play volume ranges is obtained according to statistics information of the mobile terminal, the mobile terminal records various play volume values selected by users under a certain noise volume level, to obtain a corresponding play volume range under the certain noise volume level, and counts various play volume ranges corresponding to various noise volume levels, to generate the statistics information.

In some embodiments, the mapping relation between noise volume levels and play volume ranges is preset, the mobile terminal pre-configures a plurality of noise volume levels and a plurality of play volume ranges, and records a corresponding play volume range selected by users under each of the noise volume levels, to obtain the mapping relation.

In some embodiments, the adjusting a play volume of the wireless headset within the target play volume range includes: gradually adjusting the play volume of the wireless headset along a direction from the minimum volume value to the maximum volume value or a direction from the maximum volume value to the minimum volume value within the target play volume range; the method further includes: determining a first volume value in the target play volume range as the target volume value, in response to not receiving the volume determination information during a first duration threshold after gradually adjusting the play volume of the wireless headset along a direction from the minimum volume value to the maximum volume value or a direction from the maximum volume value to the minimum volume value within the target play volume range; wherein the first volume value is a volume value that is most frequently used in the target play volume range.

In some embodiments, the mapping relationship between the external noise volume and the play volume range includes a mapping relationship between noise volume levels and application-type-based play volume ranges; before the determining the target play volume range corresponding to the external noise volume based on a mapping relationship between the external noise volume and a play volume range, the method further includes: determining a type of an application which audio signals currently generated by the mobile terminal belong to; the determining the target play volume range corresponding to the external noise volume based on a mapping relationship between the external noise volume and a play volume range includes: determining an application-type-based play volume range corresponding to the external noise volume based on the mapping relationship between the noise volume levels and the application-type-based play volume ranges.

In some embodiments, the mapping relationship between the external noise volume and the play volume range includes a mapping relationship between noise volume levels, and play volume ranges under various fit degrees; before the determining the target play volume range corresponding to the external noise volume based on a mapping relationship between the external noise volume and a play volume range, the method further includes: receiving a fit degree feedback information sent by the wireless headset, wherein the fit degree feedback information is configured to indicate a current fit degree between the wireless headset and ears; the determining the target play volume range corresponding to the external noise volume based on a mapping relationship between the external noise volume and a play volume range includes: determining the target volume range corresponding to the external noise volume and the current fit degree based on the mapping relationship between the noise volume levels and the play volume ranges under the various fit degrees.

In some embodiments, the wireless headset includes a first wireless headset and a second wireless headset; after the adjusting a play volume of the wireless headset within the target play volume range, the method further includes: adjusting the play volume of the first wireless headset to a minimum volume value within the target play volume range in response to detecting a low battery notification information sent from the first wireless headset; wherein the low-battery notification information is configured to indicate that the power of the first wireless headset is lower than a first power threshold.

A second aspect of the present disclosure is to provide a method for controlling volume of a wireless headset, applied to the wireless headset and including: a play volume of the wireless headset is controlled by the mobile terminal.to be adjusted within a target play volume range, in response to the wireless headset being in an in-ear state and connected to the mobile terminal; sending a volume determination information to the mobile terminal, in response to a determination instruction for determining a target volume being detected; wherein the volume determination information is configured to cause the mobile terminal to determine a play volume value of the wireless headset at the time when the volume determination information is received as a target volume value, and adjust the play volume of the wireless headset to the target volume value.

In some embodiments, the determination instruction is triggered through an interactive operation with the wireless headset; the interactive operation includes at least one operation of clicking, tapping, touching and pressing on the wireless headset.

In some embodiments, a minimum value of the target play volume range is a minimum volume value of the play volume of the wireless headset in a first time period; a maximum value of the target play volume range is a maximum volume value of the play volume of the wireless headset in the first time period.

In some embodiments, the wireless headset includes a first wireless headset and a second wireless headset, and the method further includes: the first wireless headset sending a low-battery notification information to the mobile terminal, in response to the power of the first wireless headset being lower than a first power threshold; wherein the low-battery notification information is configured to indicate the mobile terminal and cause the mobile terminal to adjust the play volume of the first wireless headset to the minimum volume value within the target play volume range.

In some embodiments, the first wireless headset sends another notification information to the mobile terminal, in response to the power of the first wireless headset being lower than a second power threshold, such that the mobile terminal adjusts the play volume of the first wireless headset to another volume value except the minimum volume value within the target play volume range.

In some embodiments, the method further includes: detecting a current fit degree between the wireless headset and ears via a sensor of the wireless headset, and sending a fit degree feedback information to the mobile terminal; wherein the fit degree feedback information indicates the current fit degree.

In some embodiments, the method further includes: collecting an external noise volume and sending the external noise volume to the mobile terminal, in response to the wireless headset being in the in-ear state and connected to the mobile terminal.

A third aspect of the present disclosure is to provide a computer-readable storage medium, configured to store a computer program for electronic data exchange; wherein the computer program causes a mobile terminal to perform a method for controlling volume of a wireless headset, including: obtaining a target play volume range of the wireless headset, in response to the mobile terminal being connected to the wireless headset in an in-ear state; adjusting a play volume of the wireless headset within the target play volume range; determining the play volume of the wireless headset at a time of receiving a volume determination information as a target volume value, in response to receiving the volume determination information from the wireless headset; and adjusting the play volume of the wireless headset to the target volume value.

In some embodiments, the obtaining a target play volume range of the wireless headset includes: obtaining a minimum volume value of the play volume of the wireless headset in a first time period, and configuring the minimum volume value as a minimum value of the target play volume range; and obtaining a maximum volume value of the play volume of the wireless headset in the first time period, and configuring the maximum volume value as a maximum value of the target play volume range.

In some embodiments, the computer-readable storage medium further includes: receiving an external noise volume collected by the wireless headset; wherein the obtaining a target play volume range of the wireless headset includes: determining the target play volume range corresponding to the external noise volume based on a mapping relationship between the external noise volume and a play volume range.

In some embodiments, the wireless headset includes a first wireless headset and a second wireless headset; after the adjusting a play volume of the wireless headset within the target play volume range, the method further includes: adjusting the play volume of the first wireless headset to a minimum volume value within the target play volume range, in response to a low-battery notification information sent by the first wireless headset being detected; wherein the low-battery notification information is configured to indicate that the power of the first wireless headset is lower than a first power threshold.

BRIEF DESCRIPTION OF DRAWINGS

To further illustrate technical solutions of embodiments of the present disclosure, drawings needed for description of the embodiments will be briefly introduced. Obviously, the following drawings are only some embodiments of the present disclosure. To any one of skill in the art, other drawings may be obtained without any creative work based on the following drawings.

DETAILED DESCRIPTION

Figure 1:
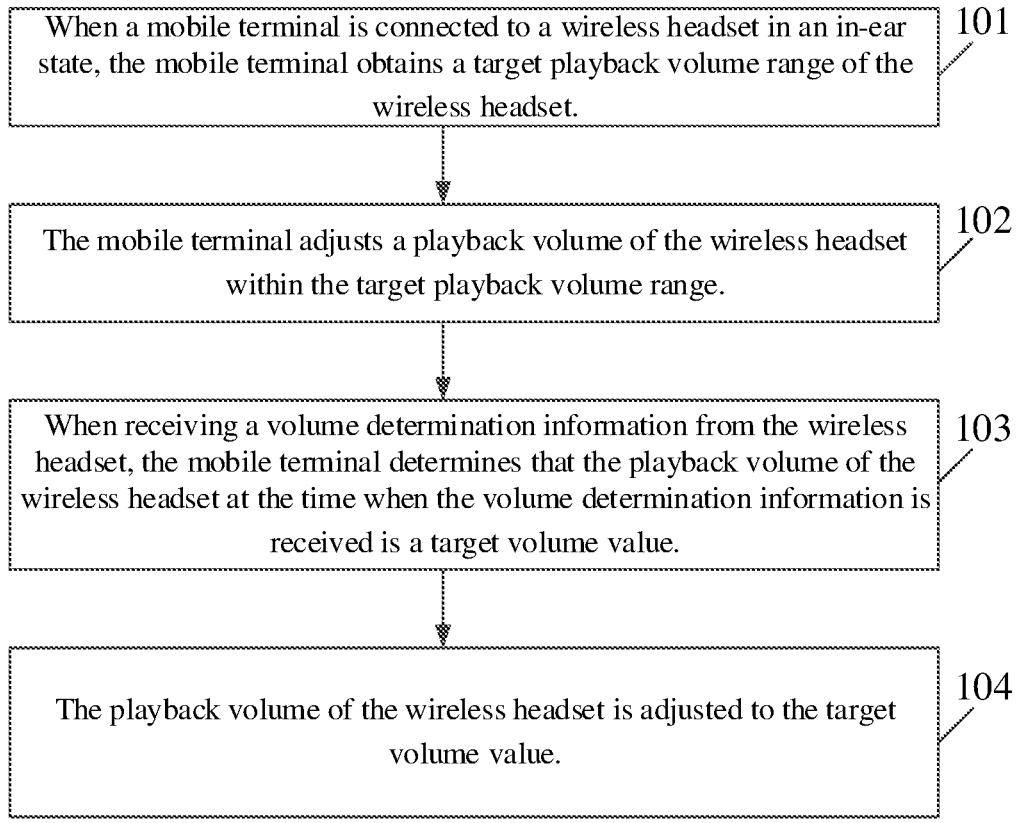
FIG. 1 is a schematic flow chart of a method for controlling volume of a wireless headset according to a first embodiment of the present disclosure.

To make any one of skill in the art to understand the technical solutions of the present disclosure, the technical solutions provided by the present disclosure will be described in details by referring to the drawings and the embodiments. Obviously, the described embodiments are only a part of the embodiments, but not all the embodiments of the present disclosure. Based on the described embodiments, all other embodiments obtained by one skilled in the art without creative efforts shall fall within the scope of the present disclosure.

Terms of "first", "second", and the like in the description and claims of the present disclosure and the above-mentioned drawings are used to distinguish different objects and not to describe a specific order. Furthermore, the terms of "including", "having" and any variations thereof are intended to cover non-exclusive inclusion. For example, a process, method, system, product, or device containing a series of steps or units is not limited to the listed steps or units, but optionally also includes steps or units that are not listed, or optionally also includes other steps or units inherent to the process, method, product or device.

It should be further understood that the terms of "and/or" in the present description and the appended claims refer to any combination of one or more of the listed items and all possible combinations, and includes these combinations.

Reference to "embodiment" herein means that a particular feature, structure, or characteristic described in connection with the embodiment may be included in at least one embodiment of the present disclosure. The appearances of this term in various places in the specification are not necessarily all referring to the same embodiment, nor are they independent or alternative embodiments that are mutually exclusive with other embodiments. It is explicitly and implicitly understood by one skilled in the art that the embodiments described herein may be combined with other embodiments.

In specific implementation, the mobile terminal described in the embodiments of the present disclosure includes, but is not limited to, other portable devices such as a mobile phone, a laptop computer, or a tablet computer with a touch-sensitive surface (for example, a touch screen display and/or a touch pad).

The mobile terminal supports various applications, such as one or more of the following: drawing applications, presentation applications, word processing applications, spreadsheet applications, gaming applications, phone applications, video conferencing applications, E-mail applications, instant messaging applications, exercise support applications, photo management applications, digital camera applications, web browsing applications, digital music player applications, and/or digital video player applications.

The wireless headset in the embodiments of the present disclosure refers to a headset of which a middle earphone cable is replaced by radio waves. An audio outlet of an audio play device is connected to a transmitting end, and signals are transmitted from the transmitting end to the headset of a receiving end through the radio waves. The receiving end may be equivalent to a radio. The wireless headset may be divided into infrared wireless headsets, meter-wave wireless headsets (Frequency Modulation (FM) headsets) and decimeter-wave wireless headsets (Bluetooth headsets).

The embodiments of the present disclosure are described in detail below.

As shown FIG. 1, FIG. 1 is a schematic flow chart of a method for controlling volume of a wireless headset according to a first embodiment of the present disclosure. The method for controlling volume of a wireless headset may be applied to a mobile terminal and include operations at blocks illustrated in FIG. 1.

At block 101: When a mobile terminal is connected to a wireless headset in an in-ear state, the mobile terminal obtains a target play volume range of the wireless headset.

In the embodiments of the present disclosure, the wireless headset may be a Bluetooth headset, and may be connected to a mobile terminal through Bluetooth technology. Bluetooth is a wireless technology standard that enables a short-range data exchange between fixed devices, mobile devices, and building personal area networks.

The wireless headset may include a sensor, a microphone, a speaker, and a wireless communication module (for example, a Bluetooth module).

The wireless headset may detect whether the wireless headset is in the in-ear state through a built-in sensor (a pressure sensor on a surface of the headset or an air pressure sensor arranged in a shell of the headset).

The mobile terminal may store a target play volume range. The target play volume range may be understood as a volume range commonly used by users. The local end of the wireless headset may record the volume value set by the users, and the mobile terminal may obtain the historical volume value recorded by the wireless headset. The local end of the wireless headset may obtain the volume range adapted for the in-ear state (that is, the target play volume range) via a statistical analysis.

The method for obtaining the target play volume range may specifically include: obtaining, by the mobile terminal, a minimum volume value and a maximum volume value of the play volume of the wireless headset in a first time period, as a minimum value and a maximum value of the target play volume range, respectively. The first time period indicates a time period in which the mobile terminal collects the historical play volume. For example, the first time period is 2 weeks, and the mobile terminal can obtain the minimum volume value and the maximum volume of the play volume of the wireless headset in the last two weeks. In this way, the target play volume range is obtained.

In some embodiments, the method further includes operations as followed.

(11) The mobile terminal receives an external noise volume collected by the wireless headset.

The obtaining the target play volume range of the wireless headset includes that (12) The mobile terminal determines the target play volume range corresponding to the external noise volume based on a mapping relationship between the noise volume and the play volume range.

When the wireless headset is in the in-ear state, the external noise may be collected through the microphone at the local end of the headset, and the external noise volume is then determined. The external noise volume is then sent to the connected mobile terminal. The mobile terminal may pair with the wireless headset to establish a communication connection. After the communication connection is established, the external noise volume collected by the wireless headset may be received, and then operation (12) is performed.

Specifically, the mobile terminal may store the mapping relationship between the noise volume and the play volume range, for example, in the form of a mapping relationship table. It can be understood that, when the noise volume is known, the play volume range corresponding to the noise volume may be found from the mapping relationship, and the play volume range is configured as the target play volume range.

The above-mentioned mapping relationship between the noise volume and the play volume range may be obtained statistically by the mobile terminal. When the wireless headset is in the in-ear state and connected to the mobile terminal, the wireless headset may collect the external noise volume, and the users may adjust the play volume of the wireless headset according to needs in different environments to achieve a most suitable play effect. The noise volume may be understood as a noise volume condition, and measured by the noise volume range or a noise volume level. For example, the play volume range corresponding to the noise volume range [a, b) is [x, y), where x and y can be expressed as a percentage of the maximum play volume. For example, x can be 15% of the maximum play volume. Under a certain noise volume condition, the mobile terminal may record a play volume value of the wireless headset set by the users. The number of the play volume values may be two or more. In a set of the play volume values, the mobile terminal may calculate the play volume range based on the maximum and minimum play volume. That is, the play volume range corresponding to the noise volume is obtained. Similarly, multiple play volume ranges corresponding to multiple noise volumes can be obtained. In this way, the mobile terminal obtains the mapping relationship between the noise volume and play volume range.

The play volume range may be understood as a play volume range commonly used by the users. In some embodiments, the mapping relationship between the noise volume and the play volume range may be set by the users. For example, multiple noise volume levels (the higher the noise volume level, the larger or smaller the noise volume) and the corresponding play volume ranges may be set in the mobile terminal. The users may select a suitable play volume range for a certain noise volume level as the play volume range corresponding to the noise volume level. After the setting is completed, the mobile terminal obtains the mapping relationship between the noise volume and the play volume range. In general, the higher the noise level, the higher the set play volume.

When the mobile terminal records the play volume value of the wireless headset set by the users, a usage time of each play volume value may also be collected. The play volume value with a longest usage time under the current noise volume condition is configured as a midpoint of the play volume range. Thus, the play volume range is obtained.

In the embodiments of the present disclosure, the mapping relationship between the noise volume and the play volume range may be obtained through various methods of statistics or calculation. The mobile terminal may use various big data calculation methods or artificial intelligence algorithms to calculate the external noise volume collected by the wireless headset and the set play volume, such that the mapping relationship is obtained, which will not be repeated herein.

It should be noted that the mapping relationship between the noise volume and play volume range is not fixed and may be determined based on historical statistics. For example, when it is detected that the environmental noise changes from a first noise volume to a second noise volume, the headset volume is manually adjusted from a first volume to a second volume, such that the mapping relationship between the second noise volume and the second volume is established.

The mobile terminal may find the play volume range corresponding to the external noise volume in the mapping relationship between the noise volume and the play volume range, and determine the play volume range as the target play volume range.

After receiving the external noise volume collected by the wireless headset, and determining the target play volume range corresponding to the external noise volume based on the mapping relationship between the noise volume and the play volume range, the play volume of the wireless headset is adjusted to a volume value in the target play volume range. In this way, an automatic setting of the play volume of the wireless headset suitable for the current environment may be achieved.

After the mobile terminal obtains the target play volume range, an operation 102 may be performed.

At block 102: The mobile terminal adjusts a play volume of the wireless headset within the target play volume range.

After determining the target play volume range, the mobile terminal may adjust the play volume of the wireless headset and dynamically adjust the play volume of the wireless headset within the target play volume range. Specifically, the current volume may be set to any volume value in the play volume range. The wireless headset may output audio signals with the above volume value.

In some embodiments, the operation 102 may include that (1) The mobile terminal adjusts the play volume of the wireless headset from small to large or from large to small within the target play volume range.

The mobile terminal may dynamically adjust the play volume of the wireless headset. The adjustment from small to large refers to a process in which the mobile terminal gradually increases the play volume within the target play volume range. For example, the target play volume range is 20%-30% of the maximum play volume. The mobile terminal may set the play volume of the wireless headset to 20% of the maximum play volume, and then gradually increase the volume up to 30% of the maximum play volume. The adjustment from large to small refers to a process in which the mobile terminal gradually decreases the play volume within the target play volume range. Similarly, for example, the target play volume range is 20%-30% of the maximum play volume. The mobile terminal may set the play volume of the wireless headset to 30% of the maximum play volume, and then gradually reduce the volume down to 20% of the maximum play volume.

After the operation 102 is performed, an operation 103 may be performed.

At block 103: When receiving a volume determination information from the wireless headset, the mobile terminal determines that the play volume of the wireless headset at the time when the volume determination information is received is a target volume value.

During the process of adjusting the play volume of the wireless headset by the mobile terminal, the users can select the play volume to be set at any time. The users may trigger a determination instruction through an interactive operation with the wireless headset to set the play volume of the wireless headset. The interactive operation may include operations such as clicking, tapping, and pressing on the wireless headset. For example, during the execution of operation 102, the users trigger the determination instruction by performing a specified tapping operation on the wireless headset (such as tapping one or two times). The wireless headset detects the tapping operation, and may send the volume determination information to the mobile terminal to determine the current play volume as the target volume value. For another example, during the execution of operation 102, the users trigger the determination instruction by performing a touch operation on the wireless headset. The wireless headset detects the touch operation, and may send the volume determination information to the mobile terminal.

In some embodiments, the interactive operation may also be a pressing operation. When the wireless headset detects a pressing operation on the wireless headset, whether a pressure value of the pressing operation is larger than a preset pressure threshold may be detected. If the pressure value is larger than the preset pressure threshold, the determination instruction is triggered. The headset sends the volume determination information to the mobile terminal.

In some embodiments, the wireless headset may include a first wireless headset and a second wireless headset. The interaction operation with the wireless headset may include an interaction with the first wireless headset to select a volume of the first wireless headset, and an interactive operation with the second wireless headset to select a volume of the second wireless headset. That is, the two wireless headsets may communicate with the mobile terminal and set the play volume respectively. In some embodiments, the first wireless headset may communicate with the mobile terminal, the second wireless headset may communicate with the first wireless headset. The interaction operation with the wireless headset is mainly directed to the first wireless headset. It can be understood that the first wireless headset is a primary headset, and the play volumes of the two wireless headsets are adjusted through the interactive operation with the primary headset.

After receiving the determination instruction, the wireless headset may send the volume determination information to the mobile terminal. After receiving the volume determination information, the wireless headset may determine that the play volume value of the wireless headset at the time when the volume determination information is received is the target volume value.

During the execution of operation 102, when the play volume of the wireless headset has been applied with the volume values in the entire target play volume range but the volume determination information has not been received, the mobile terminal may continue to perform operation 102. That is, the adjustment may be repeated, in which the play volume is changed within the target play volume range until the volume determination information is received, and then operations 103 and 104 are performed.

In some embodiments, when the mobile terminal does not receive the volume determination information sent by the wireless headset within a first duration threshold after performing the adjustment operation 102, the following operations may be performed.

The mobile terminal determines that the first volume value in the target play volume range is the target volume value. The first volume value is a volume value that is most frequently used in the target play volume range.

The mobile terminal may store the first duration threshold, and may simultaneously detect the duration of executing operation 102. When the duration of executing operation 102 exceeds the first duration threshold, it is indicated that the users have not performed the operation of selecting the target volume, and the mobile terminal may automatically select the target volume value. For example, the first volume value in the target play volume range is determined as the target volume value.

In the process of storing the volume value commonly used by the users and counting the target play volume range, the mobile terminal may also count the frequency of use of each play volume value, and store the volume value with the highest frequency of use in the target play volume range as the first volume value. If the mobile terminal does not receive the volume determination information within the first duration threshold after performing the adjustment operation 102, it may be determined that the most frequently used volume value in the target play volume range is the target volume value.

In some embodiments, the mobile terminal may also randomly select a volume value within the target play volume range as the target volume value, or select a previously selected volume value within the target play volume range as the target volume value. After the target volume value is determined, an operation 104 is performed.

At block 104: The play volume of the wireless headset is adjusted to the target volume value.

In the embodiments of the present disclosure, when a mobile terminal is connected to a wireless headset in an in-ear state, the play volume of the wireless headset is adjusted within a target play volume range. When a volume determination information from the wireless headset is received, the play volume of the wireless headset at the time when the volume determination information is received is determined as a target volume value. Then the play volume of the wireless headset is adjusted to the target volume value. The play volume range of the wireless headset may be automatically selected (which can be understood as a volume range commonly used by users). The users choose the most suitable play volume. In this way, an automatic setting of the play volume of the wireless headset suitable for the users may be achieved, such that the play volume of the wireless headset may be accurately set based on needs of the users.

Figure 2:
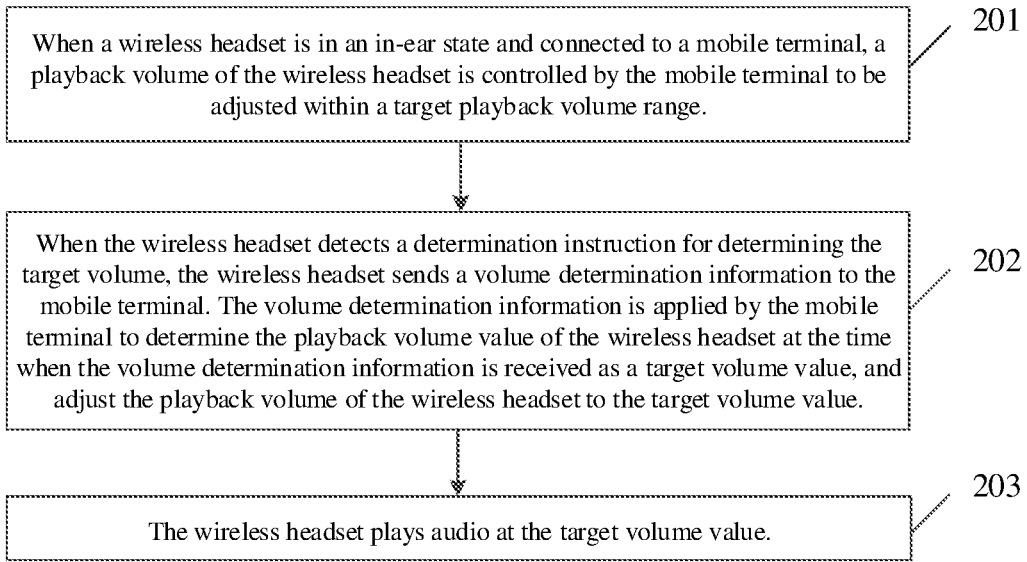
FIG. 2 is a schematic flow chart of a method for controlling volume of a wireless headset according to a second embodiment of the present disclosure.

As shown in FIG. 2, FIG. 2 is a schematic flow chart of a method for controlling volume of a wireless headset according to a second embodiment of the present disclosure. The method for controlling volume of a wireless headset may be applied to a wireless headset and include operations at blocks illustrated in FIG. 2.

At block 201: When a wireless headset is in an in-ear state and connected to a mobile terminal, a play volume of the wireless headset is controlled by the mobile terminal.to be adjusted within a target play volume range.

The wireless headset may detect whether the wireless headset is in the in-ear state through a built-in sensor (a pressure sensor on a surface of the headset or an air pressure sensor arranged in a shell of the headset). The process of the mobile terminal controlling the adjustment of the wireless headset within the target play volume range may be referred to detailed description in operations 101 and 102 of the embodiments shown in FIG. 1, and details are not described herein again.

At block 202: When the wireless headset detects a determination instruction for determining the target volume, the wireless headset sends a volume determination information to the mobile terminal. The volume determination information is applied by the mobile terminal to determine the play volume value of the wireless headset at the time when the volume determination information is received as a target volume value, and adjust the play volume of the wireless headset to the target volume value.

During the process of adjusting the play volume of the wireless headset by the mobile terminal, the users can select the play volume to be set at any time. The users may trigger a determination instruction through an interactive operation with the wireless headset to set the play volume of the wireless headset. The interactive operation may include operations such as clicking, tapping, and pressing on the wireless headset. The interactive operations may be referred to the detailed description in the operation 103 of the embodiments shown in FIG. 1, and details are not described herein again.

After detecting the determination instruction, the wireless headset may send volume determination information to the mobile terminal. When the mobile terminal receives the volume determination information, it may be determined that the play volume value of the wireless headset at the time when the volume determination information is received is the target volume value, and operation 203 may be performed.

In some embodiments, the method further includes that (21) The wireless headset collects an external noise volume when the wireless headset is in the in-ear state and connected to the mobile terminal.

The operation 202 may include that (22) The wireless headset sends the external noise volume to the mobile terminal, such that the mobile terminal determines the target play volume range corresponding to the external noise volume based on a mapping relationship between the noise volume and the play volume range, and adjusts the play volume of the wireless headset to a volume value within the target play volume range.

The wireless headset may detect whether the wireless headset is in the in-ear state through a built-in sensor (a pressure sensor on a surface of the headset or an air pressure sensor arranged in a shell of the headset). When the mobile terminal is connected to the wireless headset and the wireless headset is in the in-ear state, the external noise may be collected through the microphone at the local end of the headset. The external noise is then sent to the connected mobile terminal, such that the external noise volume is determined by the mobile terminal. In some embodiments, the mobile terminal may pair with the wireless headset to establish a communication connection. After the communication connection is established, the external noise volume collected by the wireless headset may be received, The wireless headset may collect the external noise volume via a microphone, which may be periodic. The wireless headset may collect the external noise volume every a detection range threshold. It should be noted that, since the ambient noise does not usually change much within a time period, the detection may be performed at the detection range threshold (for example, 30 seconds). In some embodiments, when the volume of the external noise collected is the same as the volume of the external noise collected last time, operation (22) may be omitted. The above operations may save power of the wireless headset.

After collecting the external noise volume, the wireless headset may send the external noise volume to the connected mobile terminal. The adjustment process after the mobile terminal receives the external noise volume may be referred to operations (11) and (12) in the embodiments shown in FIG. 1, and details will not be repeated herein again.

At block 203: The wireless headset plays audio at the target volume value.

When the wireless headset is in the in-ear state and connected to the mobile terminal, the external noise volume is collected and sent to the mobile terminal, such that the mobile terminal determines the target play volume range corresponding to the external noise volume based on the mapping relationship between the noise volume and the play volume range, and adjusts the play volume of the wireless headset to the volume value in the target play volume range. In this way, the mobile terminal may play audios with the volume value in the target play volume range, without requirements for the users to manually adjust, such that an automatic setting of the play volume of the wireless headset suitable for the current environment may be achieved.

In the embodiments of the present disclosure, when the wireless headset is in the in-ear state and connected to the mobile terminal, the play volume of the wireless headset is controlled by the mobile terminal to be adjusted within the target play volume range. When the determination instruction for determining the target volume is detected, the volume determination information is sent to the mobile terminal. The volume determination information is applied by the mobile terminal to determine the play volume value of the wireless headset when the volume determination information is received, and to adjust the play volume of the wireless headset to the target volume value. Audios can be played at the target volume value, and the users do not need to manually adjust multiple times, such that an automatic and quick setting of user-friendly wireless headset play volume may be achieved.

Figure 3:
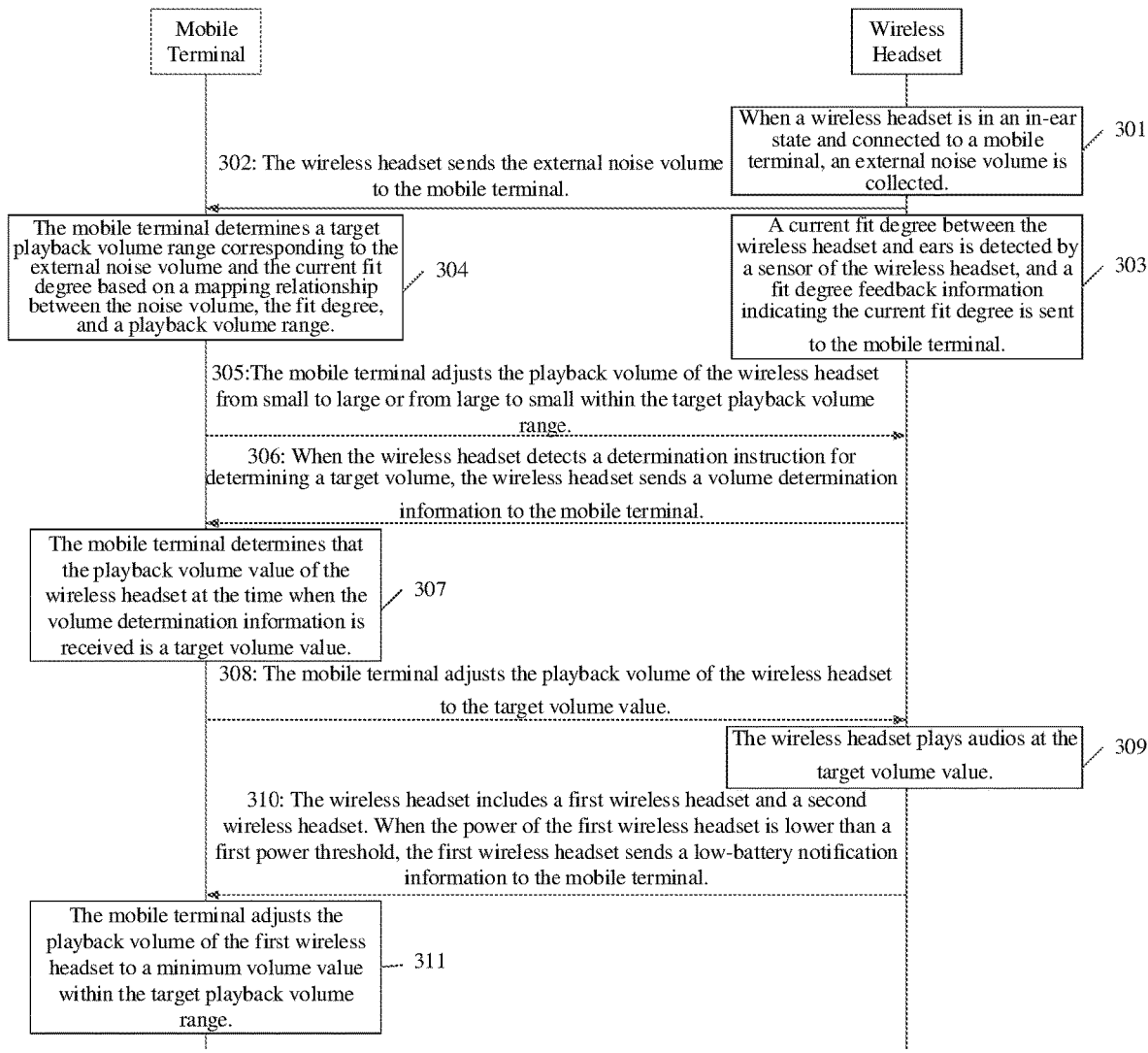
FIG. 3 is a schematic flow chart of a method for controlling volume of a wireless headset according to a third embodiment of the present disclosure.

As shown in FIG. 3, FIG. 3 is a schematic flow chart of a method for controlling volume of a wireless headset according to a third embodiment of the present disclosure. FIG. 3 is further optimized based on FIG. 1 and FIG. 2. The method for controlling volume of the wireless headset is applicable to an interaction process between the wireless headset and the mobile terminal, and may include operations at blocks illustrated in FIG. 3.

At block 301: When a wireless headset is in an in-ear state and connected to a mobile terminal, an external noise volume is collected.

At block 302: The wireless headset sends the external noise volume to the mobile terminal.

The external noise may be collected through the microphone at the local end of the headset, and the external noise volume is then determined. The external noise volume is then sent to the connected mobile terminal. The mobile terminal may pair with the wireless headset to establish a communication connection. After the communication connection is established, the external noise volume collected by the wireless headset may be received, and then operation 302 is performed.

The operations 301 and 302 may be referred to the detailed descriptions of operations (21) and (22) in the embodiments shown in FIG. 2, respectively, and details are not described herein again.

At block 303: A current fit degree between the wireless headset and ears is detected by a sensor of the wireless headset, and a fit degree feedback information indicating the current fit degree is sent to the mobile terminal.

The fit degree of the headset refers to a fit degree of the headset to the ears of the users. Generally, the higher the fit degree, the higher the energy transmitted from the speaker of the headset to the ears. Therefore, when determining the play volume based on the noise volume, the fit degree of the headset may also be considered.

The fit degree of the headset may be detected by a pressure sensor on a surface of the headset, and may also be detected by an air pressure sensor arranged in a shell of the headset.

The wireless headset detecting the fit degree of the headset may be periodic, and after detecting the fit degree of the headset, the fit degree feedback information may be sent to the mobile terminal.

At block 304: The mobile terminal determines a target play volume range corresponding to the external noise volume and the current fit degree based on a mapping relationship between the noise volume, the fit degree, and a play volume range.

Specifically, the mobile terminal may receive the fit degree feedback information from the wireless headset to determine the current fit degree of the wireless headset. The mobile terminal may store the mapping relationship between the noise volume, fit degree, and play volume range, for example, in the form of a mapping relationship table. It can be understood that, when the noise volume and the current fit degree of the headset are known, a corresponding play volume range is found in the mapping relationship and configured as the target play volume range. In general, when the known noise volume is determined, the higher the current fit degree of the headset, the smaller the corresponding play volume range; when the current fit degree of the headset is determined, the higher the known noise volume, the larger the volume of the corresponding play volume range.

The above-mentioned mapping relationship between the noise volume and the play volume range may be obtained statistically by the mobile terminal. When the wireless headset is in the in-ear state and connected to the mobile terminal, the wireless headset may collect the external noise volume, and the users may adjust the play volume of the wireless headset according to needs in different environments to achieve a most suitable play effect. The noise volume may be understood as a noise volume condition, and measured by the noise volume range or a noise volume level. For example, the play volume range corresponding to the noise volume range [a, b) is [x, y), where x and y can be expressed as a percentage of the maximum play volume. For example, x can be 15% of the maximum play volume. Under a certain noise volume condition, the mobile terminal may record a play volume value of the wireless headset set by the users. The number of the play volume values may be two or more. In a set of the play volume values, the mobile terminal may calculate the play volume range based on the maximum and minimum play volume. That is, the play volume range corresponding to the noise volume is obtained. Similarly, multiple play volume ranges corresponding to multiple noise volumes can be obtained. In this way, the mobile terminal obtains the mapping relationship between the noise volume and play volume range.

The play volume range may be understood as a play volume range commonly used by the users. In some embodiments, the mapping relationship between the noise volume and the play volume range may be set by the users. For example, multiple noise volume levels (the higher the noise volume level, the larger or smaller the noise volume) and the corresponding play volume ranges may be set in the mobile terminal. The users may select a suitable play volume range for a certain noise volume level as the play volume range corresponding to the noise volume level. After the setting is completed, the mobile terminal obtains the mapping relationship between the noise volume and the play volume range. In general, the higher the noise level, the higher the set play volume.

In the operation 304, the mobile terminal may first determine the play volume range corresponding to the external noise volume based on the mapping relationship between the noise volume and the play volume range, and further determine the target play volume range in combination with the fit degree of the headset. In general, it can be set that the higher the noise volume, the higher the corresponding play volume range; the higher the fit degree of the headset, the lower the corresponding play volume range. For example, when the external noise volume level is 3, and the fit degree of the headset is 60%, the corresponding target play volume range may be 32%-40% of the maximum play volume. When the fit degree of the headset is 80% at the same external noise volume, the corresponding target play volume range may be 25%-33% of the maximum play volume.

Since situations in which the users wear the headset are different, when the fit degree of the headset is different, the actual volume received by the users through the headset will be greatly affected, and influences thereon from external noise are also different. In the embodiments of the present disclosure, the fit degree of the headset is determined, such that the energy situation of the wireless headset received by the ears may be more accurately determined. Compared with determining the play volume only based on the external noise volume, the play volume of the wireless headset most suitable for the current environment and the users may be more accurately obtained.

In some embodiments, the mapping relationship between the noise volume and the play volume range includes the mapping relationship between the noise volume and an application-type-based play volume range. The operation 304 may also include operations as followed.

A type of an application that currently generates the audio signal in the mobile terminal is determined.

Based on the mapping relationship between the noise volume and an application-type-based play volume range, the application-type-based play volume range corresponding to the external noise volume is determined.

Specifically, when different applications of the mobile terminal are used, the play volume of the wireless headsets commonly used by users may be different. Therefore, it may be considered to detect the type of the application that currently generates the audio signal to determine the play volume. The mobile terminal may store the mapping relationship between the noise volume and the application-type-based play volume range, for example, in the form of a mapping relationship table. It can be understood that, when the noise volume and the type of application that currently generates the audio signal are known, a corresponding play volume range may be found in the mapping relationship, and configured as the application-type-based play volume range.

The mobile terminal may store the mapping relationship between the noise volume and the application-type-based play volume range corresponding to different application types. That is, under a same noise volume condition, when the current application that generates the audio signal is of different type, the set play volume may be different. The mobile terminal may classify the applications, which can be divided by the application types, such as game applications, video play applications, and music play applications. Or, the users may set the application type, such as a first application type including Application 1 and Application 2; and a second application type including Application 3. Each of the application types corresponds to a mapping relationship between the noise volume and application-type-based play volume range. The mobile terminal may first determine the type of the application that currently generates the audio signal, and then obtain the mapping relationship between the noise volume and the application-type-based play volume range corresponding to the application type, and then determine the application-type-based play volume range. For example, the user uses a mobile terminal running the Application 2 which belongs to the first application type, while audios played through the wireless headset come from the Application 2. The mobile terminal determines that the type of the application currently generating the audio signal is the first application type, that is, the mapping relationship between the noise volume and the application-type-based play volume range corresponding to the current first application type can be obtained. In this way, the application-type-based play volume range is determined. In general, it can be set that the higher the noise volume, the higher the corresponding play volume range.

After the target play volume range is determined, operation 305 may be performed.

At block 305: The mobile terminal adjusts the play volume of the wireless headset from small to large or from large to small within the target play volume range.

At block 306: When the wireless headset detects a determination instruction for determining a target volume, the wireless headset sends a volume determination information to the mobile terminal.

At block 307: The mobile terminal determines that the play volume value of the wireless headset at the time when the volume determination information is received is a target volume value.

At block 308: The mobile terminal adjusts the play volume of the wireless headset to the target volume value.

At block 309: The wireless headset plays audios at the target volume value.

The operations 305, 307, and 308 may be referred to the detailed description in operations 102 and 103 of the embodiments shown in FIG. 1, and the operation 306 may be referred to the detailed description in operation 202 of the embodiments shown in FIG. 2, which will not repeated herein.

At block 310: The wireless headset includes a first wireless headset and a second wireless headset. When the power of the first wireless headset is lower than a first power threshold, the first wireless headset sends a low-battery notification information to the mobile terminal.

In the embodiments of the present disclosure, the wireless headset may include a first wireless headset and a second wireless headset. The first wireless headset and the second wireless headset may be connected to the mobile terminal, respectively. Or, the mobile terminal is communicatively connected to the first wireless headset, and the first wireless headset is communicatively connected with the second wireless headset. In this embodiments, the mobile terminal may implement a play volume adjustment function of the first wireless headset and the second wireless headset, respectively, which is particularly suitable for users with different listening habits on left and right ears, or with large differences in external noise volume on both sides of the ears. The mobile terminal and the two wireless headsets may perform the foregoing operations separately to determine the target play volume range of each wireless headset, such that the play volume of the first wireless headset and that of the second wireless headset are automatically set respectively for the current environment.

Taking the first wireless headset as an example for illustration, the first wireless headset may store a first power threshold, for example, 20% of the total power. When the power of the first wireless headset is detected to be lower than the first power threshold, the first wireless headset may send the low-battery notification information to the mobile terminal, and then operation 311 may be performed.

At block 311: The mobile terminal adjusts the play volume of the first wireless headset to a minimum volume value within the target play volume range.

When the mobile terminal detects the low battery notification information sent by the first wireless headset, the mobile terminal may adjust the play volume of the first wireless headset to a minimum volume value within the target play volume range. In some embodiments, the first wireless headset may store two or more power thresholds. Similarly, when the first wireless headset is detected to be at a different power, the first wireless headset may send a corresponding notification information to the mobile terminal. The mobile terminal may adjust the volume value of the first wireless headset based on different notification information. In the embodiments of the present disclosure, the power of the wireless headsets may be saved while ensuring the listening effect of the wireless headsets.

In the embodiments of the present disclosure, when the wireless headset is in the in-ear state and is connected to the mobile terminal, the external noise volume is collected, and the wireless headset sends the external noise volume to the mobile terminal. The wireless headset can also detect the current fit degree between the wireless headset and the ears through the sensor of the wireless headset, and send the fit degree feedback information indicating the current fit degree to the mobile terminal. The mobile terminal determines the target play volume range corresponding to the external noise volume and the current fit degree based on the mapping relationship between the noise volume, the fit degree, and the play volume range. The mobile terminal the play volume of the wireless headset from small to large or from large to small within the target play volume range. When the wireless headset detects a determination instruction for determining a target volume, the wireless headset sends a volume determination information to the mobile terminal. The mobile terminal determines that the play volume value of the wireless headset at the time when the volume determination information is received is the target volume value. The mobile terminal adjusts the play volume of the wireless headset to the target volume value. The wireless headset plays audio at the target volume value. The wireless headset may include a first wireless headset and a second wireless headset. When the power of the first wireless headset is lower than the first power threshold, the first wireless headset may send the low-battery notification information to the mobile terminal, such that the mobile terminal adjusts the play volume of the first wireless headset to a minimum volume value within the target play volume range to save power. In the embodiments of the present disclosure, can automatically adjust the play volume of a wireless headset suitable for the current environment, an automatic setting of the play volume of the wireless headset suitable for the current environment may be achieved without requiring manual adjustment by the users.

Figure 4:
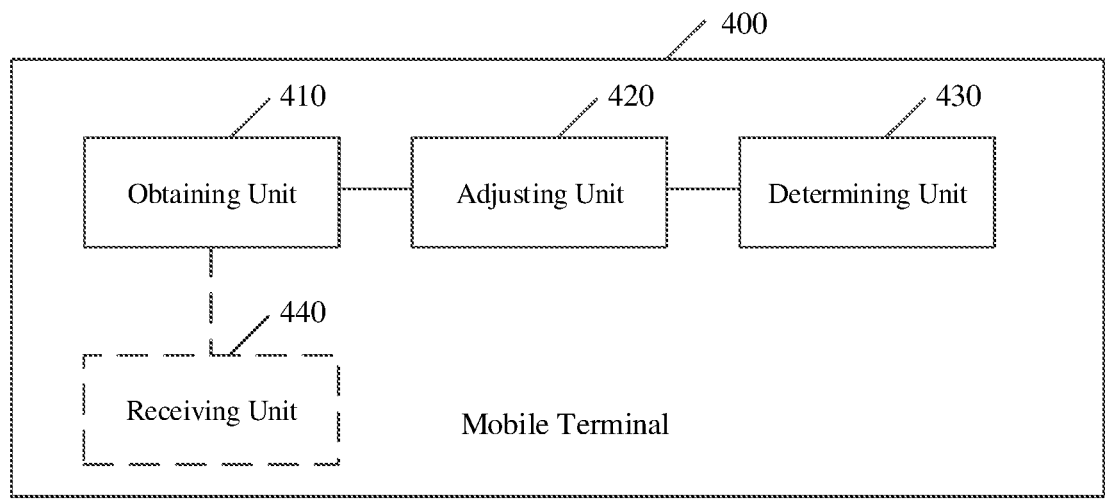
FIG. 4 is a structural schematic view of a mobile terminal according to an embodiment of the present disclosure.

As shown in FIG. 4, FIG. 4 is a structural schematic view of a mobile terminal according to an embodiment of the present disclosure. A mobile terminal 400 may include an obtaining unit 410, an adjusting unit 420, and a determining unit 430.

The obtaining unit 410 is configured to obtain a target play volume range of a wireless headset when the mobile terminal is connected to the wireless headset in an in-ear state.

The adjusting unit 420 is configured to adjust a play volume of the wireless headset within the target play volume range.

The determining unit 430 is configured to determine, when receiving a volume determination information from the wireless headset, the play volume of the wireless headset at the time when the volume determination information is received as a target volume value.

The adjusting unit 420 is further configured to adjust the play volume of the wireless headset to the target volume value.

In some embodiments, the obtaining unit 410 is specifically configured to obtain a minimum volume value and a maximum volume value of the play volume of the wireless headset in a first time period, as the minimum and maximum values of the target play volume range, respectively.

In some embodiments, the mobile terminal 400 further includes a receiving unit 440 configured to receive an external noise volume collected by the wireless headset.

The obtaining unit 410 is specifically configured to determine the target play volume range corresponding to the external noise volume based on a mapping relationship between the noise volume and the play volume range.

In some embodiments, the adjusting unit 420 is specifically configured to adjust the play volume of the wireless headset from small to large or from large to small within the target play volume range.

When the volume determination information sent by the wireless headset is not received within the first duration threshold after performing the operation of adjusting the play volume of the wireless headset in the target play volume range from small to large or from large to small, the determining unit 430 is further configured to determine a first volume value in the target play volume range as the target volume value. The first volume value is a volume value that is most frequently used in the target play volume range.

In some embodiments, the mapping relationship between the noise volume and the play volume range includes the mapping relationship between the noise volume and an application-type-based play volume range.

The determining unit 430 is further configured to determine the type of the application of the mobile terminal currently generating audio signals.

The determining, by the determining unit 430, the target play volume range corresponding to the external noise volume based on the mapping relationship between the noise volume and the play volume range includes: determining, by the determining unit 430, the application-type-based play volume range corresponding to the external noise volume based on the mapping relationship between the noise volume and the application-type-based play volume range.

In some embodiments, the mapping relationship between the noise volume and the play volume range includes the mapping relationship between the noise volume and the fit degree and the play volume range.

The receiving unit 440 is further configured to receive a fit degree feedback information sent by the wireless headset. The fit degree feedback information is configured to indicate the current fit degree between the wireless headset and ears.

The determining, by the determining unit 430, the target play volume range corresponding to the external noise volume based on the mapping relationship between the noise volume and the play volume range includes: determining, by the determining unit 430, the target play volume range corresponding to the external noise volume and the current fit degree based on the mapping relationship between the noise volume and the fit degree and the play volume range.

In some embodiments, the wireless headset includes a first wireless headset and a second wireless headset.

When the receiving unit 440 detects a low-battery notification information sent by the first wireless headset, the adjusting unit 420 is further configured to adjust the play volume of the first wireless headset to the minimum volume value within the target play volume range. The low-battery notification information is configured to indicate that the power of the first wireless headset is lower than a first power threshold.

In the embodiments of the present disclosure, the mobile terminal 400 obtains the target play volume range of the wireless headset when the mobile terminal 400 is connected to the wireless headset in the in-ear state, and adjusts the play volume of the wireless headset within the target play volume range. In the case where the volume determination information from the wireless headset is received, the play volume of the wireless headset at the time when the volume determination information is received is determined as the target volume value. The play volume of the wireless headset is adjusted to the target volume value. The users do not need to manually adjust multiple times, such that an automatic and quick setting of user-friendly wireless headset play volume may be achieved.

Figure 5:
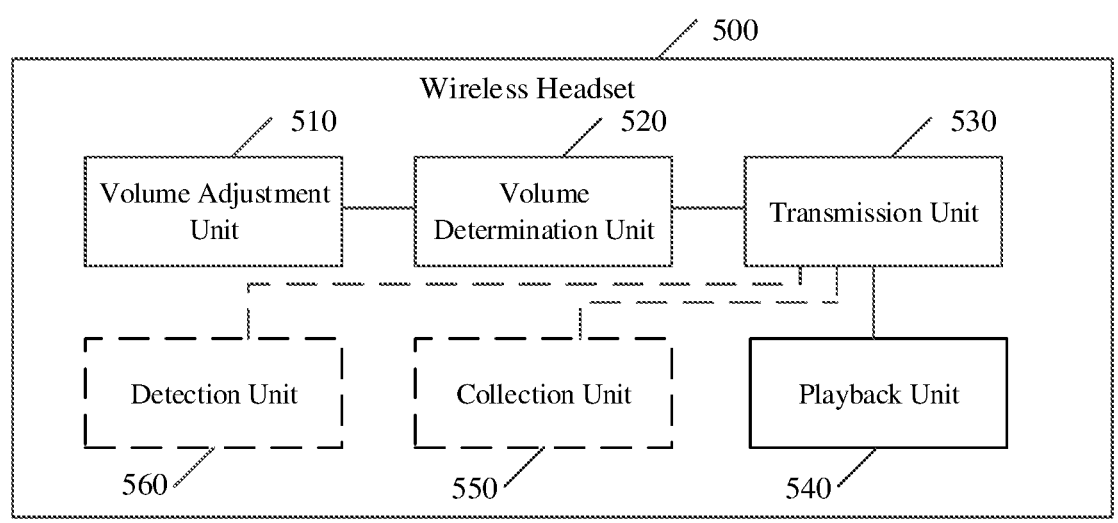
FIG. 5 is a structural schematic view of a wireless headset according to an embodiment of the present disclosure.

As shown in FIG. 5, FIG. 5 is a structural schematic view of a wireless headset according to an embodiment of the present disclosure. A wireless headset 500 may include a volume adjustment unit 510, a volume determination unit 520, a transmission unit 530, and a play unit 540.

The volume adjustment unit 510 is configured to adjust a play volume of the wireless headset in a target play volume range when the wireless headset is in an in-ear state and is connected to a mobile terminal.

The volume determination unit 520 is configured to detect a determination instruction for determining a target volume.

The transmission unit 530 is configured to send a volume determination information to the mobile terminal when the volume determination unit 520 detects the determination instruction for determining the target volume. The volume determination information is configured to make the mobile terminal determine the play volume of the wireless headset at the time when the volume determination information is received as a target volume value, and adjust the play volume of the wireless headset to the target volume value.

The play unit 540 is configured to play audios at the target volume value.

In some embodiments, a minimum value and a maximum value of the target play volume range are a minimum volume value and a maximum volume value of the play volume of the wireless headset set by the users in a first period, respectively.

In some embodiments, the wireless headset 500 further includes a collection unit 550 for collecting external noise volume when the wireless headset 500 is in the in-ear state and connected to the mobile terminal.

The transmission unit 530 is further configured to send the external noise volume to the mobile terminal, such that the mobile terminal determines the target play volume range corresponding to the external noise volume based on a mapping relationship between the noise volume and the play volume range.

In some embodiments, when the determination instruction for determining the target volume is detected, the transmission unit 530 is further configured to send the volume determination information to the mobile terminal. The volume determination information is configured to determine the play volume value of the wireless headset 500 at the time when the volume determination information is received as the target volume value, and make the mobile terminal adjust the play volume of the wireless headset 500 to the target volume value.

The play unit 540 is specifically configured to play audios at the target volume value.

In some embodiments, the wireless headset 500 further includes a detection unit 560 for detecting a current fit degree between the wireless headset and ears via a sensor of the wireless headset. The transmission unit 530 is further configured to send a fit degree feedback information indicating the current fit degree to the mobile terminal.

In some embodiments, the wireless headset 500 may include a first wireless headset and a second wireless headset.

Taking the first wireless headset as an example, the first wireless headset may include all units included in the wireless headset 500 described above. In some embodiments, when the power of the first wireless headset is lower than a first power threshold, the transmission unit 530 is further configured to send a low-battery notification information to the mobile terminal. The low-battery notification information is configured to enable the mobile terminal to adjust the play volume of the first wireless headset to the minimum volume value within the target play volume range.

In the embodiment of the present disclosure, the wireless headset 500 may be controlled by the mobile terminal to adjust the play volume of the wireless headset 500 in the target play volume range, when the wireless headset 500 is in the in-ear state and connected to the mobile terminal. When determining the determination instruction of the target volume, the volume determination information is sent to the mobile terminal. The volume determination information is configured by the mobile terminal to determine the play volume value of the wireless headset 500 at the moment when the volume determination information is received as the target volume value, and adjust the play volume of the wireless headset 500 to the target volume value. The wireless headset 500 can play audio at the target volume value. The users do not need to manually adjust multiple times, such that an automatic and quick setting of user-friendly wireless headset play volume may be achieved.

Figure 6:
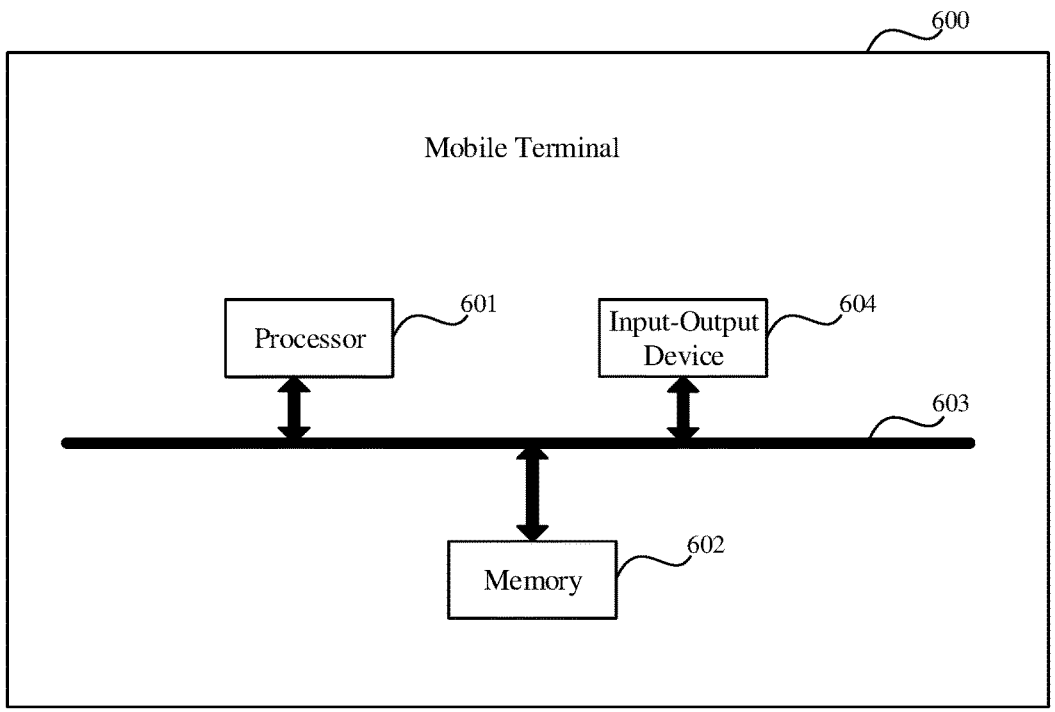
FIG. 6 is a structural schematic view of a mobile terminal according to another embodiment of the present disclosure.

As shown in FIG. 6, FIG. 6 is a structural schematic view of a mobile terminal according to another embodiment of the present disclosure. A mobile terminal 600 includes a processor 601 and a memory 602. The mobile terminal 600 may further include a bus 603. The processor 601 and the memory 602 may be connected to each other through the bus 603. The bus 603 may be a peripheral component interconnect (PCI) bus or an extended industry standard architecture (EISA) bus, etc. The bus 603 may be divided into an address bus, a data bus, a control bus, and the like. For ease of representation, only a thick line is illustrated in FIG. 6, but it does not mean that there is only one bus or one type of bus. The mobile terminal 600 may further include an input-output device 604. The input-output device 604 may include a display screen, such as a liquid crystal display screen. The memory 602 is configured to store one or more programs containing instructions. The processor 601 is configured to call the instructions stored in the memory 602 to execute some or all of the method operations performed by the mobile terminal described in the embodiments of FIG. 1 or FIG. 3.

Figure 7:
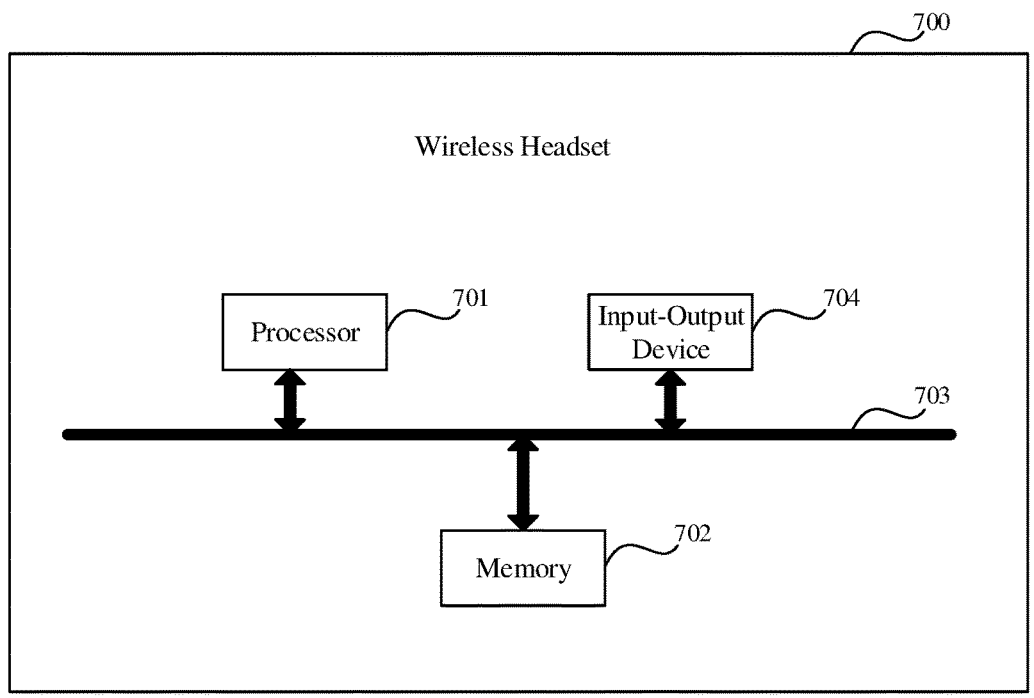
FIG. 7 is a structural schematic view of a wireless headset according to another embodiment of the present disclosure.

As shown in FIG. 7, FIG. 7 is a structural schematic view of a wireless headset according to another embodiment of the present disclosure. A wireless headset 700 includes a processor 701 and a memory 702. The wireless headset 700 may further include a bus 703, and the processor 701 and the memory 702 may be connected to each other through the bus 703. The bus 703 may be a peripheral component interconnect (PCI) bus or an extended industry standard architecture (EISA) bus, etc. The bus 703 may be divided into an address bus, a data bus, a control bus, and the like. For ease of representation, only a thick line is illustrated in FIG. 7, but it does not mean that there is only one bus or one type of bus. The wireless headset 700 may further include an input-output device 704. The input-output device 704 may include a display screen, such as a liquid crystal display screen. The memory 702 is configured to store one or more programs containing instructions. The processor 701 is configured to call the instructions stored in the memory 702 to execute some or all of the method operations performed by the mobile terminal described in the embodiments of FIG. 2 or FIG. 3.

An embodiment of the present disclosure further provides a computer storage medium. The computer storage medium stores a computer program for electronic data exchange. The computer program causes a mobile terminal to perform part or all operations of any one of the method for controlling volume of a wireless headset described in the foregoing embodiments.

An embodiment of the present disclosure further provides a computer storage medium. The computer storage medium stores a computer program for electronic data exchange. The computer program causes a wireless headset to perform part or all operations of any one of the method for controlling volume of the wireless headset described in the foregoing embodiments.

It should be noted that, for simplicity of description, the foregoing method embodiments are all described as a series of action combinations, but those skilled in the art should know that the present disclosure is not limited by the described action order. According to the present disclosure, certain operations may be performed in another order or simultaneously. Moreover, those skilled in the art should also know that the embodiments described in the specification are all preferred embodiments, and the actions and modules involved are not necessarily required by the present disclosure.

In the above embodiments, the description of each embodiment has its own emphasis. For a part that is not described in detail in one embodiment, reference may be made to related descriptions in other embodiments.

In several embodiments provided in the present disclosure, it should be understood that the disclosed device may be implemented in other ways. For example, the device embodiments described above are only schematic. For example, the division of the unit is only a logical function division. In actual implementation, there may be another division manner. For example, multiple units or components may be combined or integrated into another system. Or, some features may be ignored or not implemented. In addition, the displayed or discussed mutual coupling or direct coupling or communication connection may be indirect coupling or communication connection through some interfaces, devices or units, and may be electrical or other forms.

The units described as separate components may or may not be physically separated. The components displayed as units may or may not be physical units, that is, they may be located in one place, or may be distributed on multiple network units. Some or all of the units may be selected according to actual needs to achieve the objective of the solution of an embodiment.

In addition, each functional unit in each embodiment of the present invention may be integrated into one processing unit, or each unit may exist separately physically, or two or more units may be integrated into one unit. The above integrated unit may be implemented in the form of hardware or in the form of software functional unit.

When the integrated unit is implemented in the form of a software functional unit and sold or used as an independent product, it may be stored in a computer-readable memory. Based on this understanding, the technical solution of the present disclosure, essentially, or part that contributes to the existing technology, or all or part of the technical solution may be embodied in the form of a software product. The software product is stored in a memory, and includes several instructions to cause a computer device (which may be a personal computer, a server, or a network device, etc.) to perform all or part of the operations of the method described in various embodiments of the present disclosure. The memory includes: a U disk, a read-only memory (ROM), a random access memory (RAM), a mobile hard disk, a magnetic disk, an optical disk, or other media that can store program codes.

Those skilled in the art may understand that all or part of the operations in the various methods of the embodiments may be completed by a program instructing related hardware. The program may be stored in a computer-readable memory, and the memory may include a flash disk, a read-only memory, a random access device, a disk or an optical disk, etc.

The embodiments of the present disclosure have been described in detail above. Specific examples have been used herein to explain the principles and implementation of the present disclosure. The descriptions of the embodiments are only to help understand the method of the present disclosure and core ideas. Meanwhile, for those skilled in the art, specific implementation and disclosure scope may be changed according to the idea of the present disclosure. In summary, the content of this specification should not be construed as a limitation on the present disclosure.

What is claimed is:

1. A method for controlling a volume of a wireless headset, applied to a mobile terminal, and the method comprising:
    obtaining a target play volume range of the wireless headset, in response to the mobile terminal being connected to the wireless headset in an in-ear state;
    adjusting a play volume of the wireless headset within the target play volume range;
    determining the play volume of the wireless headset at a time of receiving a volume determination information as a target volume value, in response to receiving the volume determination information from the wireless headset; and
    adjusting the play volume of the wireless headset to the target volume value,
    wherein, when a duration of executing the operation of adjusting the play volume of the wireless headset exceeds a first duration threshold, indicating that the target volume value is not selected, the mobile terminal automatically selects a first volume value in the target play volume range as the target volume value, and
    wherein the first volume value is a volume value that is most frequently used in the target play volume range.

2. The method according to claim 1, wherein the obtaining a target play volume range of the wireless headset comprises:
    obtaining a minimum volume value of the play volume of the wireless headset in a first time period, and configuring the minimum volume value as a minimum value of the target play volume range; and
    obtaining a maximum volume value of the play volume of the wireless headset in the first time period, and configuring the maximum volume value as a maximum value of the target play volume range.

3. The method according to claim 2, further comprising:
    receiving an external noise volume collected by the wireless headset;
    wherein the obtaining a target play volume range of the wireless headset comprises:
    determining the target play volume range corresponding to the external noise volume based on a mapping relationship between noise volume levels and play volume ranges.

4. The method according to claim 3, wherein the mapping relation between noise volume levels and play volume ranges is obtained according to statistics information of the mobile terminal, the mobile terminal records various play volume values selected by users under a certain noise volume level, to obtain a corresponding play volume range under the certain noise volume level, and counts various play volume ranges corresponding to various noise volume levels, to generate the statistics information.

5. The method according to claim 3, wherein the mapping relation between noise volume levels and play volume ranges is preset, the mobile terminal pre-configures a plurality of noise volume levels and a plurality of play volume ranges, and records a corresponding play volume range selected by users under each of the noise volume levels, to obtain the mapping relation.

6. The method according to claim 3, wherein the adjusting a play volume of the wireless headset within the target play volume range comprises:
    gradually adjusting the play volume of the wireless headset along a direction from the minimum volume value to the maximum volume value or a direction from the maximum volume value to the minimum volume value within the target play volume range;
    the method further comprises:
    determining the first volume value in the target play volume range as the target volume value, in response to not receiving the volume determination information during the first duration threshold after gradually adjusting the play volume of the wireless headset along a direction from the minimum volume value to the maximum volume value or a direction from the maximum volume value to the minimum volume value within the target play volume range.

7. The method according to claim 3, wherein the mapping relationship between the external noise volume and the play volume range comprises a mapping relationship between noise volume levels and application-type-based play volume ranges;
    before the determining the target play volume range corresponding to the external noise volume based on a mapping relationship between the external noise volume and a play volume range, the method further comprises:
determining a type of an application which audio signals currently generated by the mobile terminal belong to;
the determining the target play volume range corresponding to the external noise volume based on a mapping relationship between the external noise volume and a play volume range comprises:
determining an application-type-based play volume range corresponding to the external noise volume based on the mapping relationship between the noise volume levels and the application-type-based play volume ranges.

8. The method according to claim 3, wherein the mapping relationship between the external noise volume and the play volume range comprises a mapping relationship between noise volume levels, and play volume ranges under various fit degrees;
before the determining the target play volume range corresponding to the external noise volume based on a mapping relationship between the external noise volume and a play volume range, the method further comprises:
receiving a fit degree feedback information sent by the wireless headset, wherein the fit degree feedback information is configured to indicate a current fit degree between the wireless headset and ears;
the determining the target play volume range corresponding to the external noise volume based on a mapping relationship between the external noise volume and a play volume range comprises:
determining the target volume range corresponding to the external noise volume and the current fit degree based on the mapping relationship between the noise volume levels and the play volume ranges under the various fit degrees.

9. The method according to claim 1, wherein the wireless headset comprises a first wireless headset and a second wireless headset;
after the adjusting a play volume of the wireless headset within the target play volume range, the method further comprises:
adjusting the play volume of the first wireless headset to a minimum volume value within the target play volume range in response to detecting a low battery notification information sent from the first wireless headset; wherein the low-battery notification information is configured to indicate that the power of the first wireless headset is lower than a first power threshold.

10. A method for controlling volume of a wireless headset, applied to the wireless headset and comprising:
a play volume of the wireless headset is controlled by the mobile terminal to be adjusted within a target play volume range, in response to the wireless headset being in an in-ear state and connected to the mobile terminal;
sending a volume determination information to the mobile terminal, in response to a determination instruction for determining a target volume being detected; wherein the volume determination information is configured to cause the mobile terminal to determine a play volume value of the wireless headset at the time when the volume determination information is received as a target volume value, and adjust the play volume of the wireless headset to the target volume value;
wherein, when a duration of adjusting the play volume of the wireless headset exceeds a first duration threshold, indicating that the target volume value is not selected, the mobile terminal automatically selects a first volume value in the target play volume range as the target volume value, and
wherein the first volume value is a volume value that is most frequently used in the target play volume range.

11. The method according to claim 10, wherein the determination instruction is triggered through an interactive operation with the wireless headset; the interactive operation comprises at least one operation of clicking, tapping, touching and pressing on the wireless headset.

12. The method according to claim 10, wherein a minimum value of the target play volume range is a minimum volume value of the play volume of the wireless headset in a first time period; a maximum value of the target play volume range is a maximum volume value of the play volume of the wireless headset in the first time period.

13. The method according to claim 12, wherein the wireless headset comprises a first wireless headset and a second wireless headset, and the method further comprises:
the first wireless headset sending a low-battery notification information to the mobile terminal, in response to the power of the first wireless headset being lower than a first power threshold; wherein the low-battery notification information is configured to indicate the mobile terminal and cause the mobile terminal to adjust the play volume of the first wireless headset to the minimum volume value within the target play volume range.

14. The method according to claim 13, wherein the first wireless headset sends another notification information to the mobile terminal, in response to the power of the first wireless headset being lower than a second power threshold, such that the mobile terminal adjusts the play volume of the first wireless headset to another volume value except the minimum volume value within the target play volume range.

15. The method according to claim 10, further comprising:
detecting a current fit degree between the wireless headset and ears via a sensor of the wireless headset, and sending a fit degree feedback information to the mobile terminal; wherein the fit degree feedback information indicates the current fit degree.

16. The method according to claim 10, further comprising:
collecting an external noise volume and sending the external noise volume to the mobile terminal, in response to the wireless headset being in the in-ear state and connected to the mobile terminal.

17. A non-transitory computer-readable storage medium, configured to store a computer program for electronic data exchange; wherein the computer program causes a mobile terminal to perform a method for controlling volume of a wireless headset, comprising:
obtaining a target play volume range of the wireless headset, in response to the mobile terminal being connected to the wireless headset in an in-ear state;
adjusting a play volume of the wireless headset within the target play volume range;
determining the play volume of the wireless headset at a time of receiving a volume determination information as a target volume value, in response to receiving the volume determination information from the wireless headset; and
adjusting the play volume of the wireless headset to the target volume value, wherein, when a duration of executing the operation of adjusting the play volume of the wireless headset exceeds a first duration threshold, indicating that the target volume value is not selected, the mobile terminal automatically selects a first volume value in the target play volume range as the target volume value, and wherein the first volume value is a volume value that is most frequently used in the target play volume range.

18. The non-transitory computer-readable storage medium according to claim 17, wherein the obtaining a target play volume range of the wireless headset comprises:

obtaining a minimum volume value of the play volume of the wireless headset in a first time period, and configuring the minimum volume value as a minimum value of the target play volume range; and obtaining a maximum volume value of the play volume of the wireless headset in the first time period, and configuring the maximum volume value as a maximum value of the target play volume range.

19. The non-transitory computer-readable storage medium according to claim 17, further comprising:

receiving an external noise volume collected by the wireless headset;

wherein the obtaining a target play volume range of the wireless headset comprises:

determining the target play volume range corresponding to the external noise volume based on a mapping relationship between the external noise volume and a play volume range.

20. The non-transitory computer-readable storage medium according to claim 17, wherein the wireless headset comprises a first wireless headset and a second wireless headset;

after the adjusting a play volume of the wireless headset within the target play volume range, the method further comprises:

adjusting the play volume of the first wireless headset to a minimum volume value within the target play volume range, in response to a low-battery notification information sent by the first wireless headset being detected;

wherein the low-battery notification information is configured to indicate that the power of the first wireless headset is lower than a first power threshold.

* * * * *